(12) United States Patent
Srinivasan et al.

(10) Patent No.: US 12,664,184 B2
(45) Date of Patent: Jun. 23, 2026

(54) MONITORING SYSTEM

(71) Applicant: The Travelers Indemnity Company, Hartford, CT (US)

(72) Inventors: Vinod Srinivasan, Avon, CT (US); Aditya C. Dasnurkar, West Simsbury, CT (US); Karthick Selvaraj, South Windsor, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 441 days.

(21) Appl. No.: 17/466,103

(22) Filed: Sep. 3, 2021

(65) Prior Publication Data

US 2023/0070209 A1 Mar. 9, 2023

(51) Int. Cl.
| | |
|---|---|
| *G06F 16/3329* | (2025.01) |
| *G06F 9/445* | (2018.01) |
| *G06F 11/30* | (2006.01) |
| *G06F 16/332* | (2025.01) |
| *G06F 16/334* | (2025.01) |
| *G06F 16/951* | (2019.01) |
| *G06F 16/9535* | (2019.01) |
| *G06N 5/025* | (2023.01) |

(52) U.S. Cl.
CPC ...... *G06F 16/3329* (2019.01); *G06F 9/44526* (2013.01); *G06F 11/3006* (2013.01); *G06F 16/3326* (2019.01); *G06F 16/3344* (2019.01); *G06F 16/951* (2019.01); *G06F 16/9535* (2019.01); *G06N 5/025* (2013.01)

(58) Field of Classification Search
CPC ............. G06F 16/3329; G06F 16/3326; G06F 16/3344; G06F 16/9535; G06F 16/951; G06F 9/44526; G06F 11/3006; G06N 5/025
See application file for complete search history.

(56) References Cited

U.S. PATENT DOCUMENTS

| | | | | | |
|---|---|---|---|---|---|
| 7,831,433 | B1 * | 11/2010 | Belvin | ..................... | G10L 15/18 |
| | | | | | 704/275 |
| 2002/0112035 | A1 * | 8/2002 | Carey | ................... | G06F 16/958 |
| | | | | | 709/219 |
| 2010/0114944 | A1 * | 5/2010 | Adler | .................... | G10L 13/027 |
| | | | | | 707/E17.062 |

(Continued)

*Primary Examiner* — Bhavesh M Mehta
*Assistant Examiner* — Edward Tracy, Jr.
(74) *Attorney, Agent, or Firm* — CANTOR COLBURN LLP

(57) ABSTRACT

A system includes a network interface configured to communicate with a plurality of components across a network. The system also includes a memory system configured to store a plurality of instructions to implement a monitoring system and a processing system configured to communicate with the network interface. The processing device is further configured to execute the instructions to result in accessing one or more monitoring rules that define monitoring criteria associated with the components and monitoring the components to determine whether the monitoring criteria are met. The processing device can also trigger a notification to one or more user systems based on determining that at least one of the monitoring criteria has been met and provide a customization interface to allow user customization of the one or more monitoring rules.

24 Claims, 12 Drawing Sheets

(56)  References Cited

U.S. PATENT DOCUMENTS

| | | | | |
|---|---|---|---|---|
| 2014/0040167 A1* | 2/2014 | Matignon | ................ | G06N 5/02 |
| | | | | 706/11 |
| 2016/0139575 A1* | 5/2016 | Funes | .................... | G06N 5/047 |
| 2016/0188609 A1* | 6/2016 | Strassner | ................ | G06F 16/81 |
| | | | | 707/740 |
| 2017/0220943 A1* | 8/2017 | Duncan | ..................... | G06F 8/38 |
| 2017/0301215 A1* | 10/2017 | Charlton | ................ | G08B 23/00 |
| 2018/0067790 A1* | 3/2018 | Chheda | .................. | G06F 9/547 |
| 2018/0349473 A1* | 12/2018 | Smith | ................. | G06F 16/3329 |
| 2018/0349474 A1* | 12/2018 | Smith | ................. | G06F 16/3329 |
| 2020/0410395 A1* | 12/2020 | Ray | ......................... | G06F 40/30 |
| 2021/0050009 A1* | 2/2021 | Lo | ........................... | G06F 40/30 |
| 2021/0302953 A1* | 9/2021 | Zhou | ................. | G05B 23/0297 |
| 2021/0349950 A1* | 11/2021 | Setlur | .................... | G06F 40/30 |
| 2021/0374130 A1* | 12/2021 | Lavi | ................... | G06F 11/3495 |

* cited by examiner

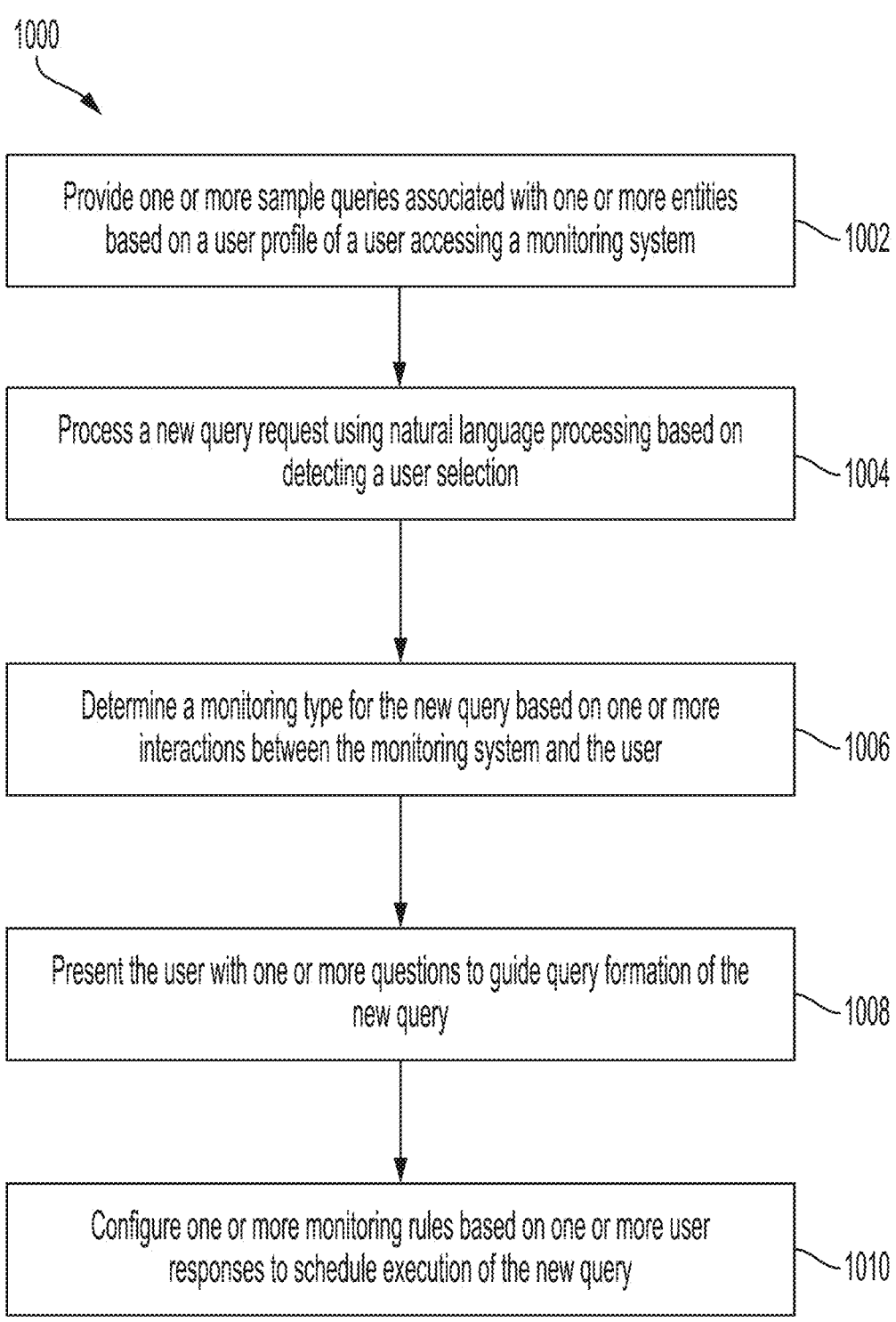

1000

Provide one or more sample queries associated with one or more entities based on a user profile of a user accessing a monitoring system — 1002

Process a new query request using natural language processing based on detecting a user selection — 1004

Determine a monitoring type for the new query based on one or more interactions between the monitoring system and the user — 1006

Present the user with one or more questions to guide query formation of the new query — 1008

Configure one or more monitoring rules based on one or more user responses to schedule execution of the new query — 1010

FIG. 10

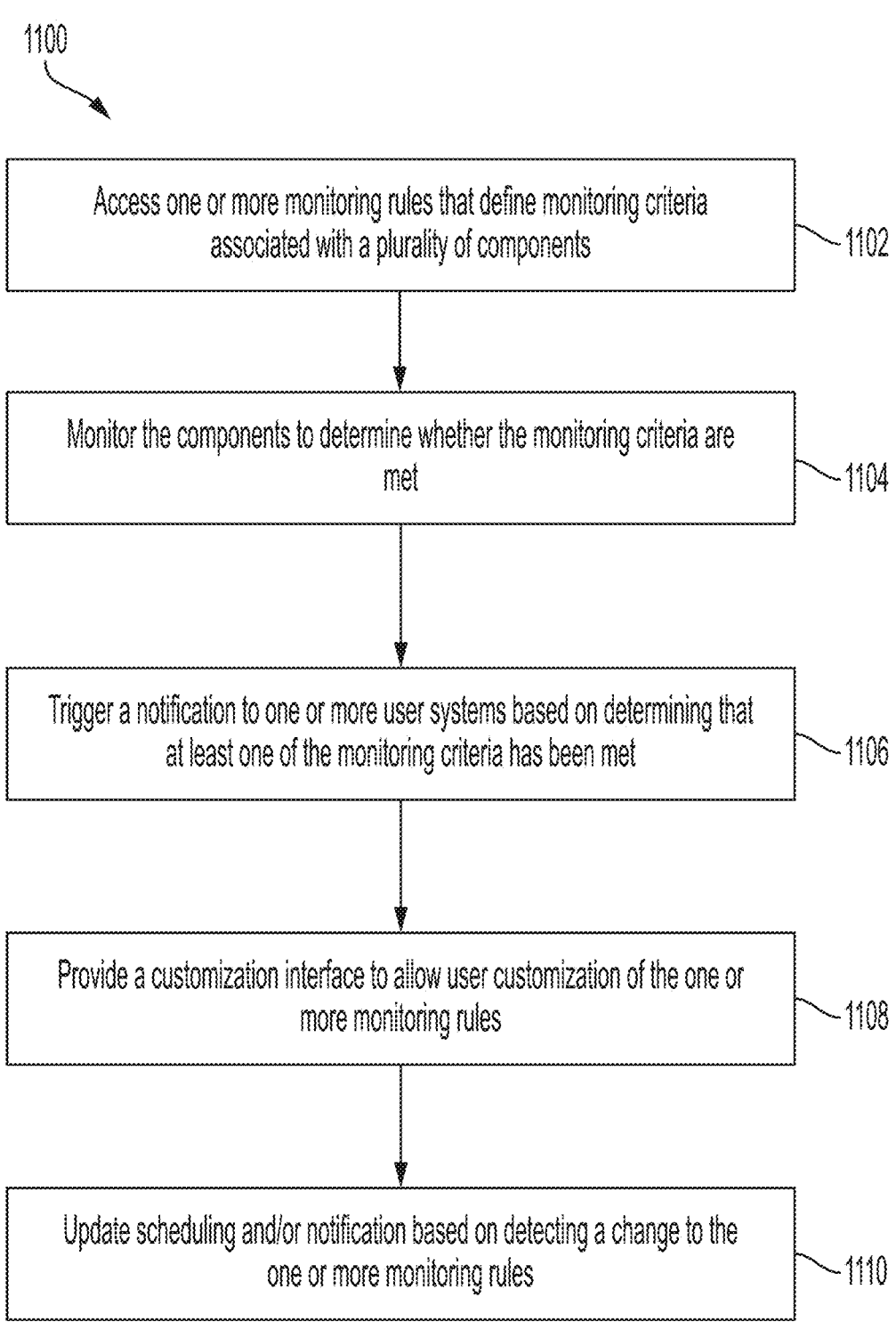

1100

Access one or more monitoring rules that define monitoring criteria associated with a plurality of components ~1102

Monitor the components to determine whether the monitoring criteria are met ~1104

Trigger a notification to one or more user systems based on determining that at least one of the monitoring criteria has been met ~1106

Provide a customization interface to allow user customization of the one or more monitoring rules ~1108

Update scheduling and/or notification based on detecting a change to the one or more monitoring rules ~1110

FIG. 11

MONITORING SYSTEM

BACKGROUND

Data monitoring and management for many large enterprise computer systems can be challenging, with a fragmented data ecosystem often resulting in inefficient technical and development efforts to bring data together. The challenge is further exacerbated in a dynamic environment, where data changes are nearly continuous in the underlying large data ecosystem. There can be a significant lag and, in some cases, an inability to proliferate these changes in the form of insights to other systems and devices that use the data. The inability to provide timely data and recognize underlying changes can result in reduced accuracy in decision-making systems. A wide scope of data sources with asynchronous changes can present challenges in managing updates in various applications and systems that depend upon the data for additional processing actions and notifications.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 10 depicts a query configuration process flow according to some embodiments of the present invention; and FIG. 11 depicts a monitoring process according to some embodiments of the present invention.

DETAILED DESCRIPTION

Figure 1:
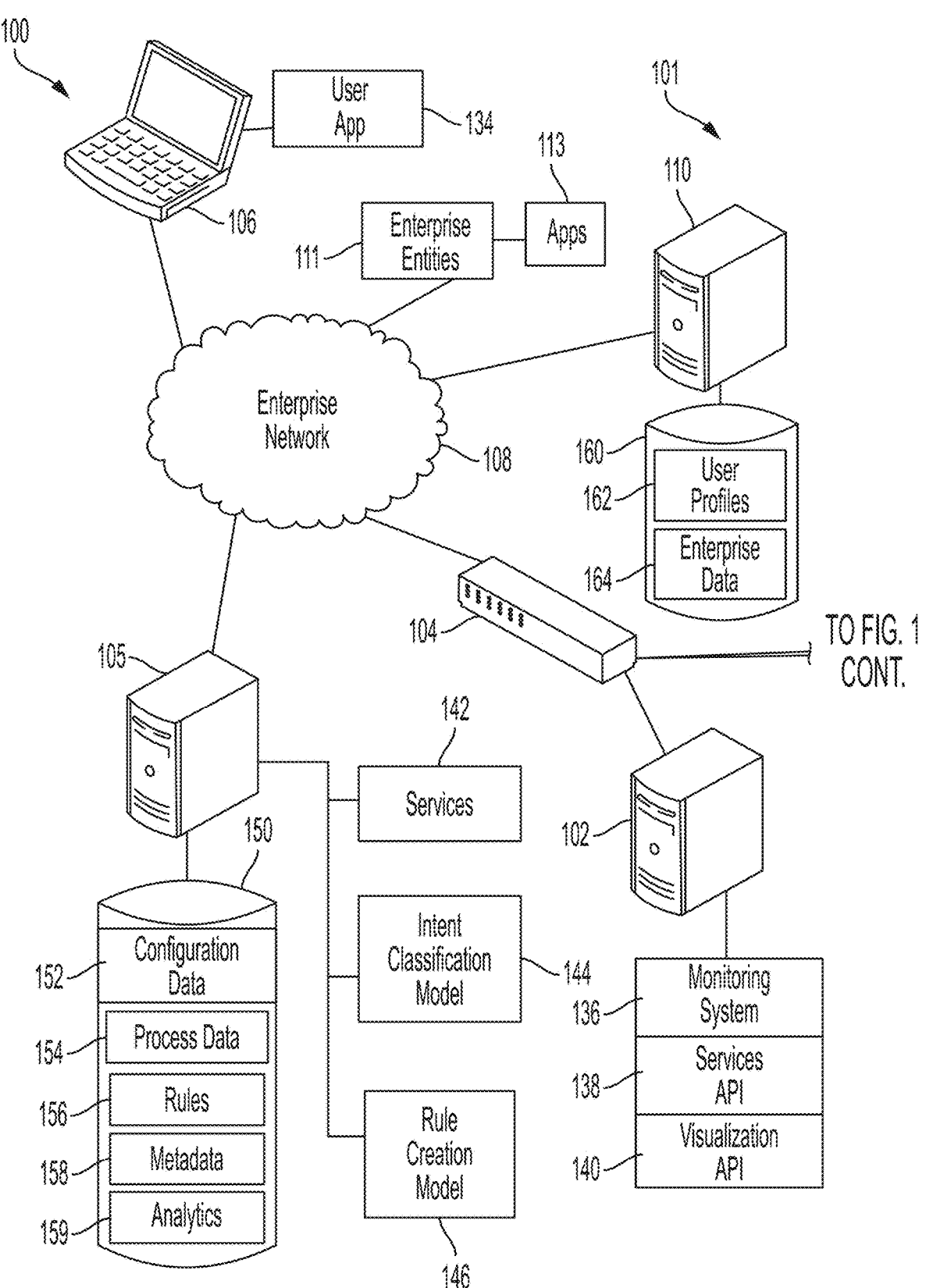
FIG. 1 depicts a block diagram of a system according to some embodiments of the present invention.
Figure 1:
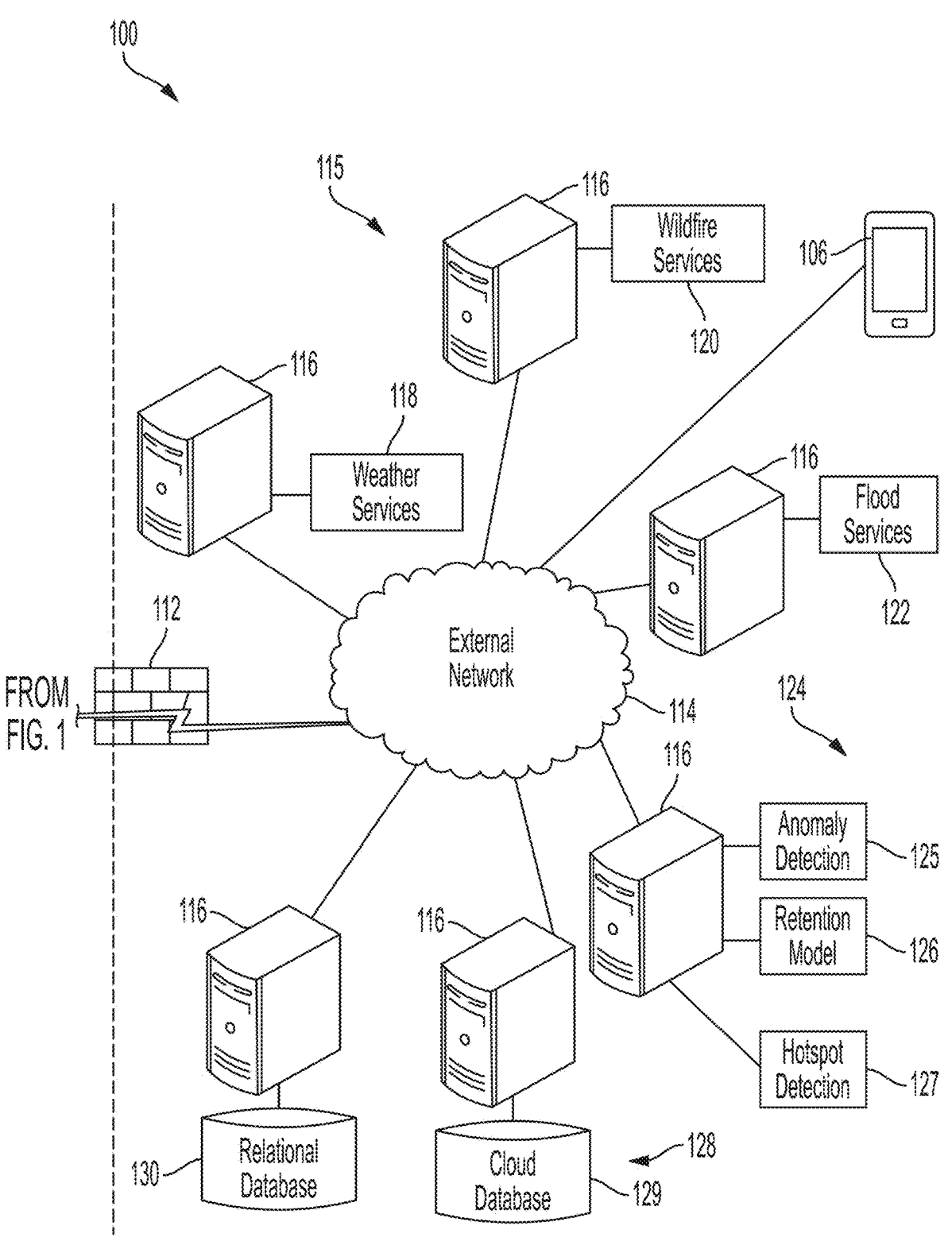

According to an embodiment, a system for monitoring multiple data sources through multiple components is provided along with notifications of detected events or conditions. The system may be used for various practical applications of monitoring a data ecosystem through automated queries that shift monitoring and notification burdens from multiple separate devices into a shared monitoring system. Users interested in receiving notifications about changes in underlying data may not recognize available components to access data distributed across the data ecosystem. Complex queries can involve multiple data sources distributed across various servers that may not be readily known by users. Further, data quality can vary where copies of data are propagated through multiple data storage servers. For example, data sources may be updated at different intervals and thus may be unsynchronized when data updates occur. Further, groups of users relying upon data for analytics and other purposes may experience different results where data source selection is inconsistent across the group. Embodiments provide an automated monitoring system that can suggest data sources, queries, and notifications for consistent results across an enterprise.

Embodiments can include an artificial intelligence agent that continuously monitors and detects changes in large data ecosystems and initiates alerts/notifications based on user preferences. The monitoring system can provide a no-code intuitive conversational experience powered by an extensible application programming interface (API). The monitoring system can scan across a vast data ecosystem and bring timely personalized notifications for performing further actions. The monitoring system can be personalized for data monitoring and alerting to trigger proactive actions. The monitoring system can be accessed through an interactive "button" or link in a web-based or application-based user interface.

The use of conversational artificial intelligence can bring a simplified user experience to the day-to-day workflow of users across many fields. The user interface can allow users to personalize notification and alerting preferences or allow users to accept suggestions based on learned configurations. The monitoring system can be contextually aware such that information relevant to user profiles and preferences is used in making suggestions. The monitoring system may operate through background scheduling to operate independently of whether user devices are active, inactive, or turned off. The monitoring system can be accessed through a direct user interface or a plugin integrated in an application or webpage. The monitoring system can have a metadata layer and may be powered by artificial intelligence machine-learning services to learn and understand usage behaviors across multiple user profiles and learn to make recommendations based on similar profiles. The monitoring system can provide analytics to make continuous improvement to features of the monitoring system, as well as improve the user experience.

In addition, the monitoring system can use APIs to support interfacing with a variety of data ecosystems. The APIs can support availability in various applications, allowing the monitoring system to be fully and readily interoperable within a large enterprise. The monitoring system not only allows proactive monitoring of internal data within an enterprise system, but also enables seamless access to external events (e.g., perils, etc.) that impact decision logic of the enterprise system.

Turning now to FIG. 1, a system 100 is depicted upon which data source monitoring and notification may be implemented. The system 100 can include an enterprise network zone 101 including a monitoring server 102 coupled to a gateway 104 operable to establish communication with a data processing server 105, one or more user systems 106, one or more data storage servers 110, one or more enterprise entities 111, and/or other devices (not depicted) through an enterprise network 108. The gateway 104 may also establish communication with an external network 114, for instance, through a firewall 112, to send and receive data to/from a plurality of external servers 116 in an external network zone 115. The external servers 116 can each execute one or more applications and/or services. Examples of the applications and/or services can include, for instance, weather services 118, wildfire services 120, flood services 122, artificial intelligence services 124 (such as anomaly detection 125, retention model 126, and/or hotspot detection 127), and/or database services 128 (such as a cloud database 129 and/or a relational database 130). The weather services 118, wildfire services 120, and flood services 122 are examples of third-party services that provide information related to natural disasters. Although the example of natural disasters is illustrated in the example of FIG. 1, other types of data collection and reporting services can be used in embodiments. For example, the services may be related to reporting machine/system status for diagnostic monitoring, traffic services, transportation system services, and other such conditions.

The artificial intelligence services 124 provide externally configurable services to model, track, and predict various types of anomalies, data storage, and/or areas of higher levels of activity, for example. The anomaly detection 125 can be used to train a model to learn one or more baseline characteristics and detect deviations from the baseline characteristics. The retention model 126 can be trained to detect parameters that align with maintaining a group of users or customers, for example. The hotspot detection 127 can be used to train a model to detect conditions or locations that exhibit a higher degree of change or activity.

The database services 128 can include access to different data organization structures for large amounts of data, which may be in a structured or unstructured format and can be distributed across multiple external servers 116, for example. The cloud database 129 may be distributed across multiple external servers 116. Accessing data in the cloud database 129 may be performed using different access techniques than are used for accessing data in a structured database, such as the relational database 130. For instance, queries of the relational database 130 may be structured using structured query language (SQL), while non-SQL techniques may be used to access data in the cloud database 129. The database services 128 can include private/subscription data sources and/or publicly available data sources.

Further, the external servers 116 can store various types of data and/or files, such as content and webpages. The content can include various types of data and/or user interface elements, such as information, images, video, audio, etc. One or more user systems 106 can also interface with the external network 114 and support receiving notifications and triggering further actions in response to the notifications.

In embodiments, a user of a user system 106, such as a computer system with permissions within the enterprise network zone 101, can access a user application 134 locally or through the enterprise network 108 to interface with a monitoring system 136 on the monitoring server 102. The monitoring system 136 can include or access a number of services to create and execute monitoring rules and generate notifications when monitoring criteria are met. The monitoring system 136 can communicate with various components in the system 100, for example, through a services API 138 and a visualization API 140. The services API 138 can interface with various third-party services, such as the weather services 118, wildfire services 120, and/or flood services 122. The services API 138 can also interface with services 142 in the enterprise network zone 101 to support monitoring, rule creation, and data management, for example. The visualization API 140 can interface with various applications and/or webpages, such as applications 113 to produce user interfaces for rules creation and/or reporting of notification data. For instance, when a plugin is added to the applications 113 or webpages, selection of the plugin can trigger an action through the visualization API 140 to request action performance by the monitoring system 136.

In the example of FIG. 1, the services 142 are depicted as being executed by the data processing server 105; however, the services 142 can be distributed between multiple processing systems, such as the monitoring server 102, data processing server 105, data storage servers 110, and/or external servers 116. The data processing server 105 can also manage, update, and execute various models to support the monitoring system 136, such as an intent classification model 144 and a rule creation model 146. The intent classification model 144 can interpret user input and attempt to predict an intent of the user with regard to query formation. The rule creation model 146 can assist in generating one or more monitoring rules 156 used by the monitoring system 136.

In embodiments, the monitoring system 136 can access configuration data 152 that defines configuration options which can be selected to set values for a customization interface for defining monitoring rules 156 and notification preferences, for example. Configuration and customization can be performed based on user selections and/or determined using the intent classification model 144 and/or the rule creation model 146. Process data 154 can be used to define steps of process flows to assist in determining how the monitoring rules 156 should be configured depending on a workflow process that can define the types of information needed for a current process step or a future process step. For example, during a quoting process, different information may be of interest than during a claims process. The process data 154 can be used in combination with user profiles 162 and/or enterprise data 164 to better understand the context of a user's role and an organizational structure in which the user belongs. For example, grouping multiple users having similar roles or working within a same business unit can assist with making consistent monitoring actions across groups of multiple users. For instance, if multiple users in the same group have common monitoring configurations, the existing monitoring tasks of the group can provide a basis for suggesting similar monitoring for a new user who joins the group. A user having a manager role may be given suggestions for monitoring configurations that align with multiple groups which the manager oversees. In contrast, the users of the underlying groups may only be provided with a subset of suggested monitoring configurations that best aligns with each group.

Results of executing the monitoring rules 156 can be stored in metadata 158. The monitoring system 136 or one or more of the services 142 can analyze the metadata 158 to determine analytics 159 that can be used to trigger notifications, provide supplemental data, or to form new suggestions for the monitoring rules 156. For example, the rule creation model 146 can observe the current monitoring rules 156, results as captured in metadata 158, and analytics 159 in combination with data specific to the user from user profiles 162 and/or enterprise data 164 in creating new monitoring rules. The user profiles 162 can define a role of the user, the authority level of the user, and other such information to assist in determining the types of data that the user may be interested in monitoring. The enterprise data 164 can define information associated with enterprise entities 111 and applications 113, including associations between groups of users and types of data associated with the applications 113. The monitoring rules 156 can identify specific data sources or services for collecting data and/or establishing notification criteria. Further, the monitoring rules 156 can incorporate components of the artificial intelligence services 124, as triggers or conditions to combine with other monitoring criteria.

Although the configuration data 152, process data 154, rules 156, metadata 158, and analytics 159 are all depicted within a data storage system 150 coupled to the data processing server 105, it will be understood that the configuration data 152, process data 154, rules 156, metadata 158, and/or analytics 159 can be located at any accessible location within the system 100 and need not be co-located.

In embodiments, the enterprise network zone 101 can include a plurality of networked resources that may be distributed over multiple locations, where the networked resources are access-controlled by an enterprise. The external network zone 115 may link to networked resources that are outside of enterprise control and may be distributed over a wide geographic area.

Examples of algorithms that may be applied to train the intent classification model 144 and/or rule creation model 146 can include one or more of: supervised learning, unsupervised learning, semi-supervised learning, and reinforcement learning. For instance, labeled training data can be provided to train the intent classification model 144 and/or rule creation model 146 to find model parameters that assist in detecting unlabeled data in the data sets. Linear regression and linear classifiers can be used in some embodiments. Other embodiments may use decision trees, k-means, principal component analysis, neural networks, and/or other known machine-learning algorithms. To enhance learning, the intent classification model 144 can analyze interactions of users with the monitoring system 136 to learn relationships between domain-specific terminology and components selected foe data monitoring. The rule creation model 146 can observe patterns between user profiles 162 and criteria selected for user-requested rule formation to predict rule criteria that may be desired by other users. In some embodiments, different data source formats may be monitored, such as text-based data, numerical data, image data, audio data, and/or custom-formatted data.

In the example of FIG. 1, each of the monitoring server 102, data processing server 105, user systems 106, data storage servers 110, enterprise entities 111, and external servers 116 can include one or more processors (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100. Although depicted separately, one or more of the monitoring server 102, data processing server 105, user systems 106, data storage servers 110, and/or enterprise entities 111 can be combined or further subdivided.

The user systems 106 may each be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.). It will be understood that while only two instances of the user systems 106 are shown in FIG. 1, there may be multiple user systems 106 coupled to the enterprise network 108 and/or the external network 114 in embodiments.

Each of the monitoring server 102, data processing server 105, user systems 106, data storage servers 110, enterprise entities 111, and external servers 116 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

Figure 2:
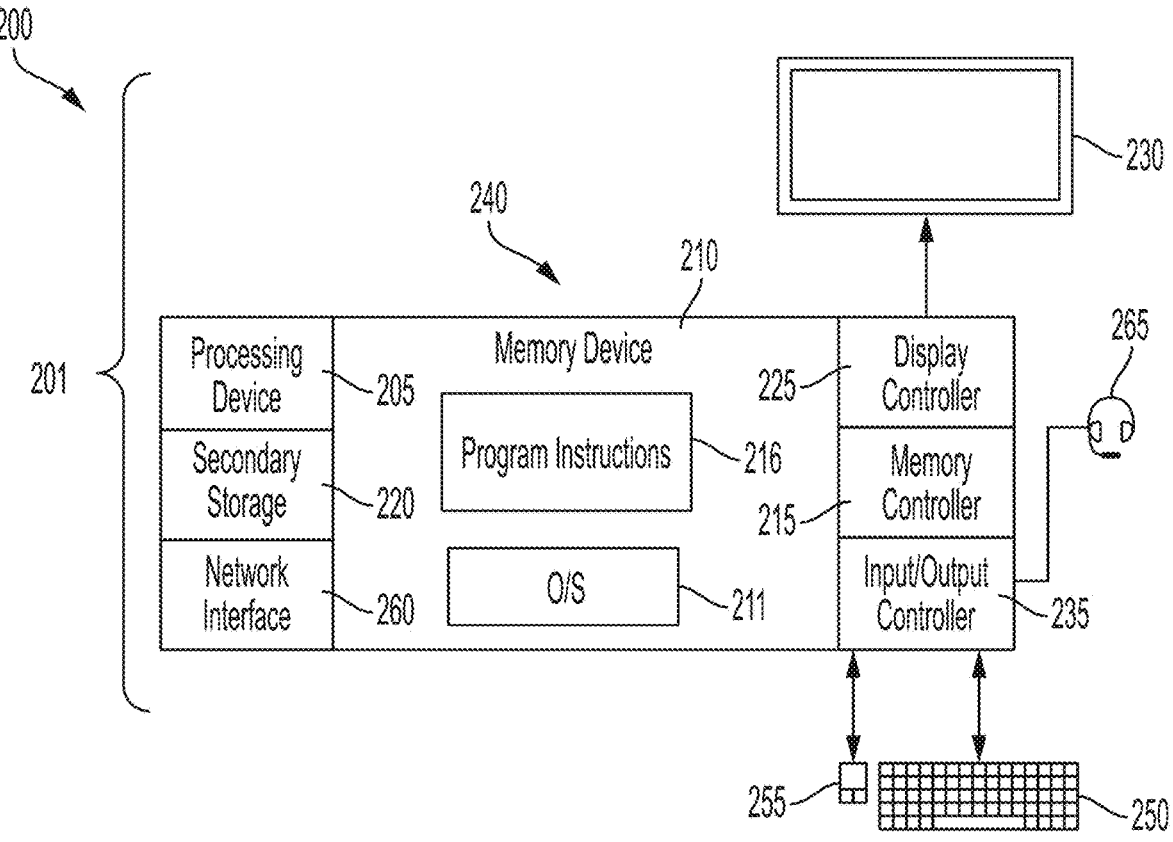
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the monitoring server 102, data processing server 105, user systems 106, data storage servers 110, enterprise entities 111, and/or external servers 116 of FIG. 1.

In an exemplary embodiment, in terms of hardware architecture, as shown in FIG. 2, the computer 201 includes a processing device 205 and a memory device 210 coupled to a memory controller 215 and an input/output controller 235. The processing device 205 can also be referred to as a processing system 205 and may include multiple processors (e.g., one or more multi-core processors). The memory device 210 can also be referred to as a memory system 210 and may include multiple types of memory in various configurations, such as a combination memory cards and memory chips with volatile and/or non-volatile storage capacity. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The input/output controller 235 can also interface with audio devices 265, such as speakers, a microphone, a headset, etc. The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the applications 113, weather services 118, wildfire services 120, flood services 122, artificial intelligence services 124, database services 128, monitoring system 136, services API 138, visualization API 140, services 142, intent classification model 144, and/or rule creation model 146 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106 of FIG. 1, the network interface 260 can establish communication channels with at least one of the monitoring server 102, data processing server 105, or data storage servers 110 via the enterprise network 108 and/or with external servers 116 via external network 114.

Figure 3:
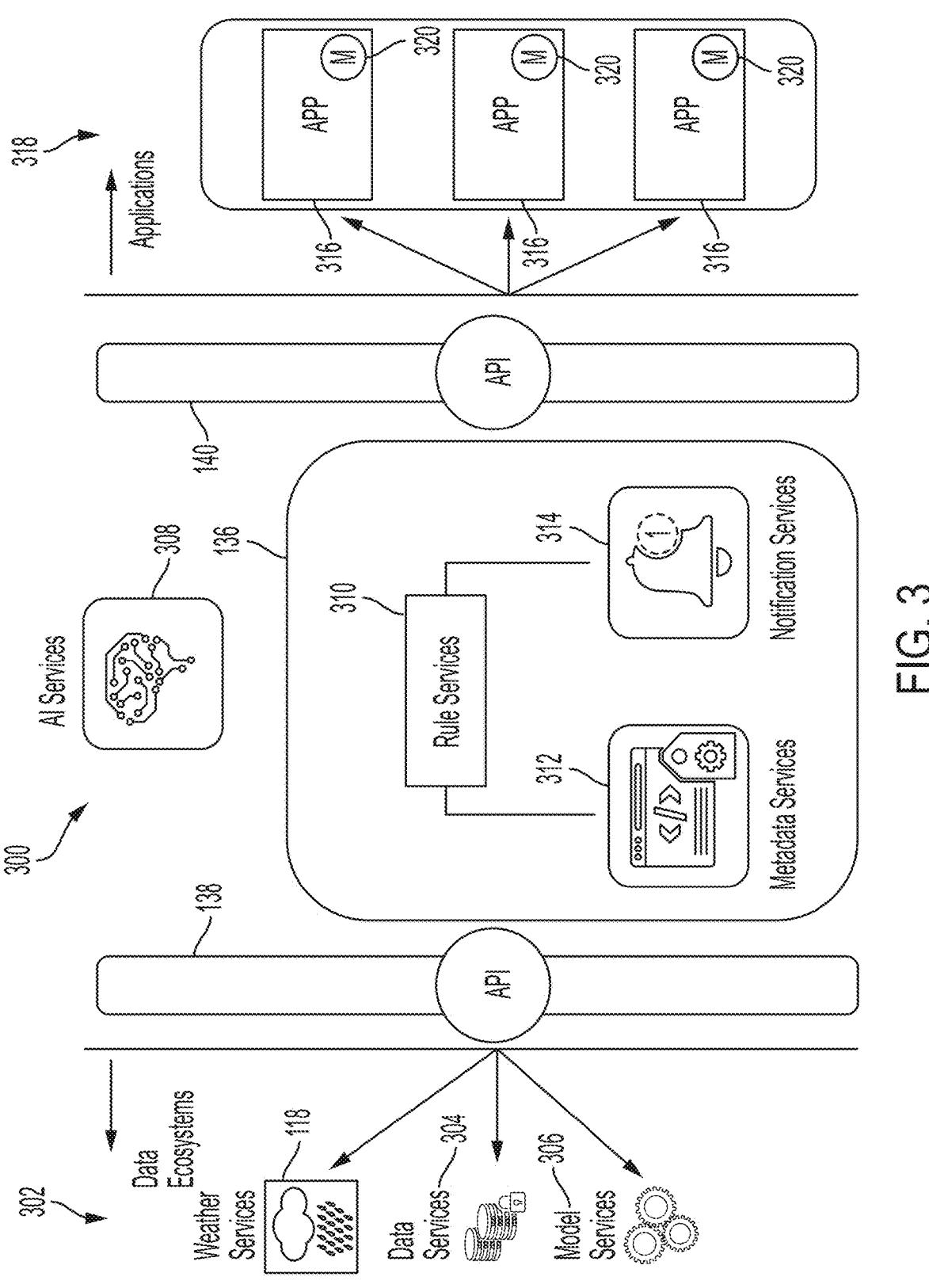
FIG. 3 depicts a block diagram of high-level interactions with a monitoring system according to some embodiments of the present invention.

FIG. 3 depicts a block diagram 300 of high-level interactions with the monitoring system 136 according to some embodiments. The monitoring system 136 can use the services API 138 to access various components 302 of data ecosystems. The components can include specific services, such as weather services 118 or other generalized service types, such as data services 304, and/or model services 306. The data services 304 can access, for example, the database services 128 of FIG. 1 to search for and retrieve records or values matching a query. The model services 306 can access, for instance, the artificial intelligence services 124 of FIG. 1 to search for patterns, anomalies, or more complex relationships between data than are directly available as existing data records.

The monitoring system 136 may have other artificial intelligence services 308 available to assist in natural language processing and rule formation rather than analyzing data sources for anomalies or hot spots. Rule services 310 can use the artificial intelligence services 308 to assist in training and using the rule creation model 146 of FIG. 1. The rules services 310 can also execute the monitoring rules 156 of FIG. 1. Metadata services 312 of the monitoring system 136 can access data, such as through data services 304 and store results in the metadata 158 of FIG. 1. Notification services 314 of the monitoring system 136 can generate notifications to one or more of the user systems 106 of FIG. 1, for example as an email message, a pop-up message, or short message service (SMS) message. Notifications generated by the notification services 314 can be sent, for instance, through the visualization API 140, where a visual and/or audio output can appear with a webpage or application 316 of an application domain 318. A plugin 320 may include a button or link that appears with the webpage or application 316 to trigger interactions with the monitoring system 136 or provide a visual or audio indicator when the notification services 314 push a notification associated with a particular user to the webpage or application 316 with the plugin 320.

When a user of the webpage or application 316 selects (e.g., clicks on) a button or link of the plugin 320, the monitoring system 136 can be informed of a user identifier and the source of the webpage or application 316 making the interaction request. The monitoring system 136 can look up further information about the user in the user profiles 162 of FIG. 1 to assist the rule services 310 and artificial intelligence services 308 with suggesting a monitoring rule to be created. For example, if the webpage or application 316 relates to property data, the rule services 310 may suggest monitoring for actual or predicted adverse weather conditions at the location of property under analysis using the weather services 118. The monitoring rule may be applied to groups of properties, such as triggering a notification when a tornado is predicted within 50 miles of the properties in the identified group. As another example, the monitoring rule may be to trigger a notification when an earthquake having a magnitude above 1.5 on the Richter scale is detected for a group of properties. Other types of monitoring rules may involve monetary values, frequency of events (e.g., lightning strikes within a geographic area), occurrence of events, forecasted events, and other such rules. Where supported, the webpage or application 316 can provide the monitoring system 136 with other context data, such as data types or records being viewed by the user and/or a history of interactions to assist in making suggestions for creating or modifying the monitoring rules 156 of FIG. 1.

Figure 4:
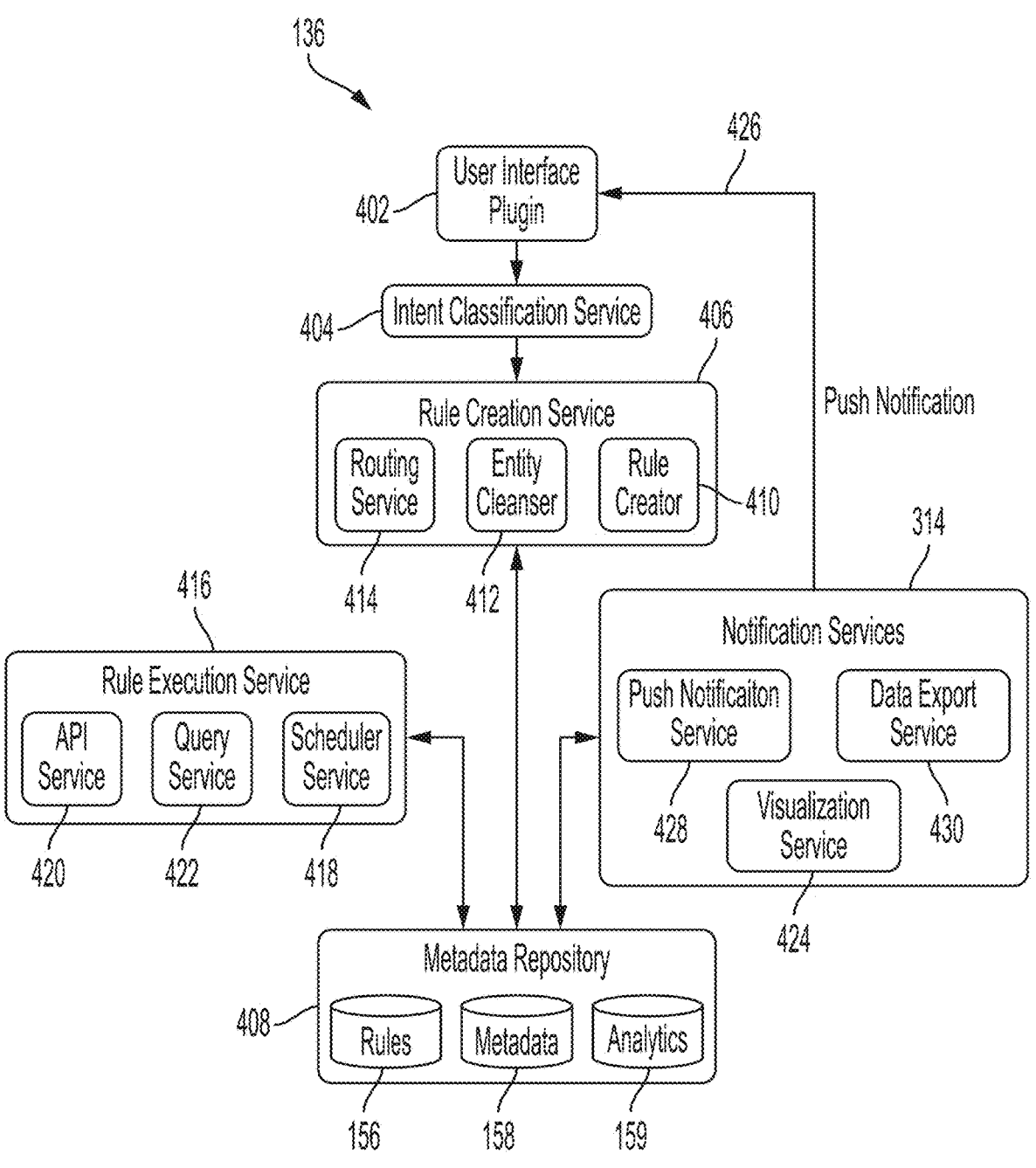
FIG. 4 depicts a block diagram of services and repositories of a monitoring system according to some embodiments of the present invention.

FIG. 4 depicts a block diagram of services and repositories of the monitoring system 136 of FIG. 1 according to some embodiments. The block diagram of FIG. 4 further elaborates on elements of the monitoring system 136 as described in FIG. 3. The monitoring system 136 can include a user interface plugin 402 that can be deployed as the plugin 320 of FIG. 3 to embed within one or more webpage or application 316 of FIG. 3. The user interface plugin 402 can be added to any front-end web application or hosted as a standalone front-end. The user interface plugin 402 can provide an interface where users create the monitoring rules 156. The user interface plugin 402 can also enable a notification channel, which allows for viewing of the monitoring results.

The monitoring system 136 can also include an intent classification service 404. The intent classification service 404 can take user statements or inputs for a rule creation service 406 and form monitoring rules 156 in a standardized format to support interpreting and parsing of the monitoring rules 156. The intent classification service 404 can be used to both determine the type of monitoring to apply to the rule (e.g., monitoring data, monitoring weather events, monitoring model outputs) and the entities that make up the rule (e.g., data source, columns to monitor, aggregations, etc.). Once the entities and intents are returned, the rule creation service 406 can save the standardized rule into the monitoring rules 156 of a metadata repository 408 for later execution.

In embodiments, the intent classification service 404 can use natural language processing techniques to extract the relevant intent and entities from the user-inputted text and inform a rule creator 410 of the rule creation service 406 type of rule to be created. The intent classification service 404 can receive text as an input and return the entities/intent back to the rule creation service 406. An entity cleanser 412 of the rule creation service 406 can adjust the terminology provided through the intent classification service 404 to match any formatting rules or other constraints associated with the entities such that the monitoring rules 156 are properly formed by the rule creator 410. A routing service 414 of the rule creation service 406 can be used to identify components or services to be used in executing the monitoring rules 156. For example, when an entity is a company, the routing service 414 can identify a component or service to be accessed for retrieving information about the entity, such as a bankruptcy status of the company.

The metadata repository 408, which may also be referred to as a registry, can include a subset of the data of the data storage system 150, such as the monitoring rules 156, metadata 158, and analytics 159. The metadata repository 408 can be accessed by the metadata services 312 of FIG. 3. In some embodiments, the metadata repository 408 can store a variety of metadata objects needed to execute the monitoring rules 156, including lookups for various connected data sources and metadata 158, service APIs, and machine-learning model endpoints. The metadata 158 can also include information about the monitoring rules 156, such as the user who created the rule, and the execution frequency of the rule. Results of executing each of the monitoring rules 156 can be summarized in the analytics 159 for consumption by the notification services 314.

The monitoring system 136 can also include a rule execution service 416. The rule creation service 406 and the rule execution service 416 are example services of the rule services 310 of FIG. 3. The rule execution service 416 can access the monitoring rules 156 from the metadata repository 408 and execute the monitoring rules 156 based on a specified schedule. The rule execution service 416 can call any targeted components to get the relevant data (e.g., third-party services, third-party APIs, data services 304 of FIG. 3, model services 306 of FIG. 3) and filter the results based on categories specified in the monitoring rules 156 (e.g., locations, thresholds, distance from an event). For example, scheduler service 418 of the rule execution service 416 can schedule execution of the monitoring rules 156 according to a defined interval (e.g., hourly, daily, weekly, monthly, etc.). The rule execution service 416 can include an API service 420 for connecting through the services API 138 of FIG. 1 to another API or service targeted by the monitoring rules 156. The rule execution service 416 can include a query service 422 that can be used to query the database services 128 of FIG. 1 or other such sources of data. The results from executing each of the monitoring rules 156 can be saved back to the metadata repository 408 for later use.

The notification services 314 can take the results from executing the monitoring rules 156 and allow users to view the results in a user interface through a visualization service 424. If the user is not logged in, the results can be presented at the next login event, for instance, through a push notification 426 sent by a push notification service 428. Output of the push notification service 428 can be in other formats, such as an SMS message. A data export service 430 of the notification services 314 can email the user who created a monitoring rule 156 at the moment that the rule completes to alert the user that the results are ready to view. The data export service 430 can also be configured to send supporting data as an attachment to the email. The visualization service 424 can call the visualization API 140 to create any requested tables or charts when serving up the results for the user to view.

Figure 5:
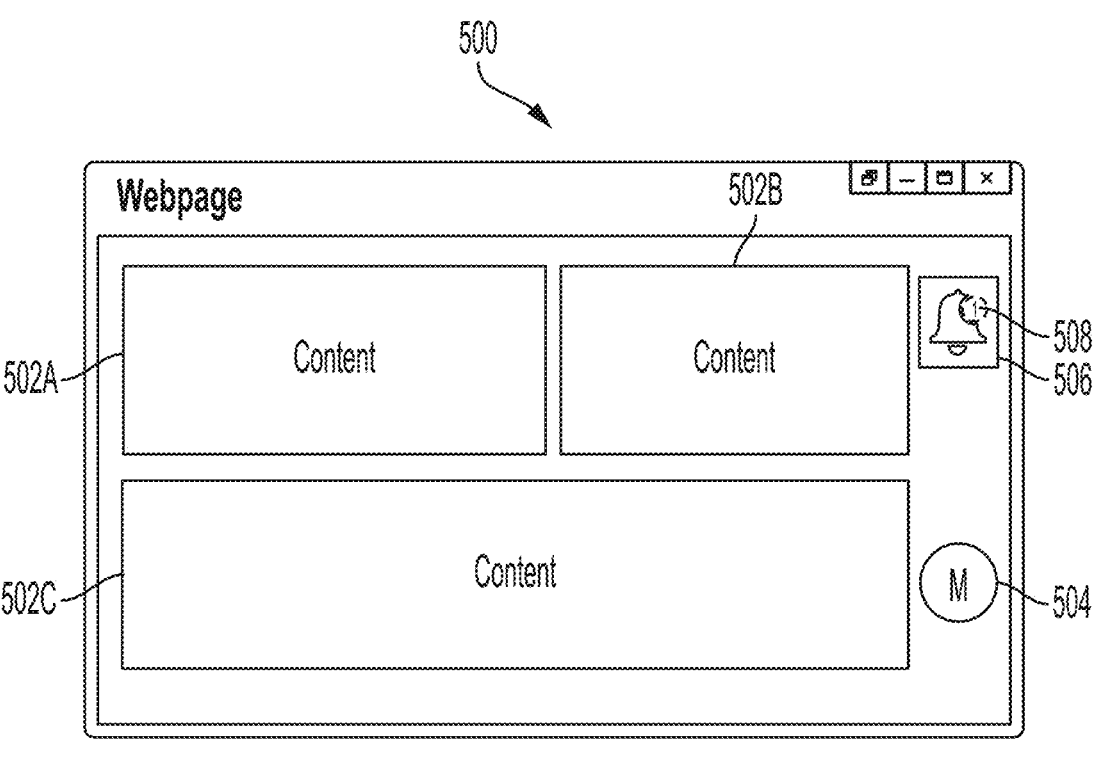
FIG. 5 depicts a webpage with a monitoring system plugin according to some embodiments of the present invention.

FIG. 5 depicts a webpage 500 with a monitoring system plugin 504 according to some embodiments. The monitoring system plugin 504 is another example of the plugin 320 of FIG. 3 and user interface plugin 402 of FIG. 4. The monitoring system plugin 504 may be displayed along with other content 502A, 502B, 502C of the webpage 500. Placement of the monitoring system plugin 504 with respect to the content 502A-C can be defined by the webpage 500. In some embodiments, the monitoring system plugin 504 may appear near an edge of a display window to minimize interference with the content 502A-C. Alternatively, the monitoring system plugin 504 can be available in a toolbar or footer section of the webpage 500.

Embedding the monitoring system plugin 504 into the webpage 500 as a clickable button can create an association with data of the content 502A-C that may be used by the monitoring system 136 of FIG. 1 in determining monitoring rule suggestions. The monitoring system plugin 504 enables users to interact with the monitoring system 136 to create various types of monitoring rules in a workflow and user-friendly way. The monitoring system plugin 504 can also enable a mechanism for users to get notified when any of the user-selected monitoring conditions are met. Clicking on the monitoring system plugin 504 on the webpage 500 can open a user interface to customize notifications with additional insights and analytics. Further, when notifications are available, a visual indication 506 may be triggered by the monitoring system plugin 504, such as an alert icon or other audio/visual change related to the monitoring system plugin 504.

The visual indication 506 may also include a numeric value 508 or other such indicator to notify the user of how many new notifications are available for viewing. For example, a user may configure multiple rules that can be met in close proximity in time. If multiple notifications are available, the numeric value 508 can change to indicate the number of new notifications since the user last examined the notification results. The visual indication 506 may remain hidden until there is at least one new notification. An audio output and/or haptic feedback can be triggered upon a new notification becoming available. Clicking on or otherwise selecting the visual indication 506 can trigger opening of a reporting interface, which may include one or more of a summary, a report, a chart, and/or other such information associated with one or more notifications. Further, notification information and/or rule configuration may be accessible upon a user tapping or otherwise selecting an input associated with the monitoring system plugin 504.

As one example, when a user clicks on the button of the monitoring system plugin 504 on the webpage 500, the monitoring system 136 can identify the user and show relevant content meant for that user as associated through the user profiles 162 of FIG. 1. A user interface of the monitoring system plugin 504 can display a chatbot interface and a set of suggested monitoring criteria based on the usage pattern of similar users as further illustrated in the example of FIG. 6A.

Figure 6A:
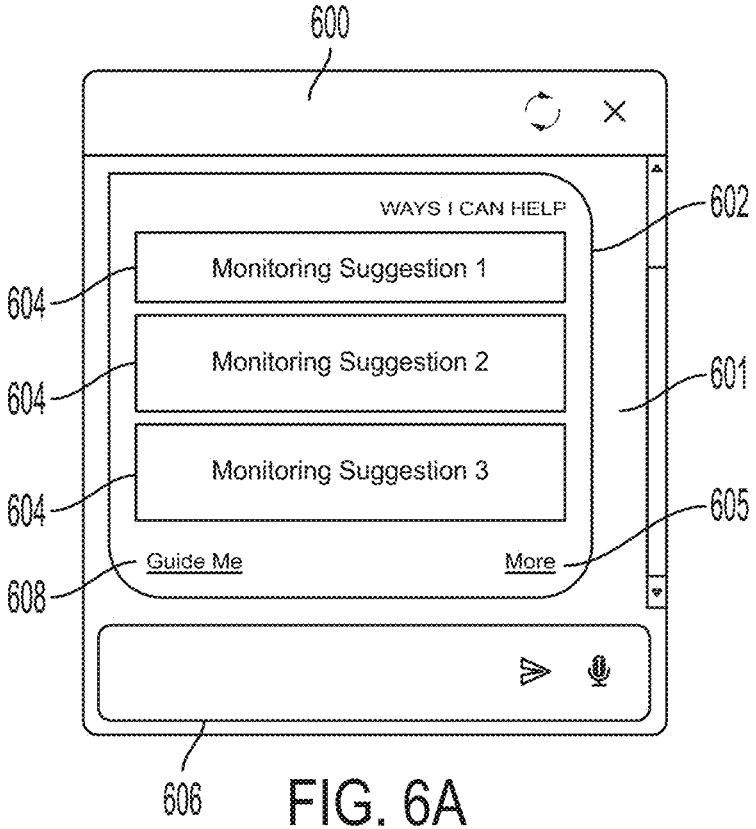
FIG. 6A depicts a user interface for monitoring suggestions according to some embodiments of the present invention.

FIG. 6A depicts a user interface 600 for monitoring suggestions according to some embodiments. The user interface 600 can be opened directly through a desktop link or through a plugin, such as the monitoring system plugin 504 of FIG. 5. Interactions with the monitoring system 136 of FIG. 1 can displayed through an interactive chat session 601. For example, the artificial intelligence services 308 of FIG. 3 can be invoked to use the rule creation model 146 to generate multiple monitoring suggestions 604 in a chatbot output 602. The monitoring suggestions 604 can be output into the interactive chat session 601 through the visualization API 140. The monitoring suggestions 604 can be displayed in a natural language format with underlying entities and monitoring criteria formatted by the rule creator 410 of FIG. 4 to comply with requirements of the rule execution service 416 of FIG. 4. For example, one suggested monitoring rule may be, "Alert me when any of my accounts file for bankruptcy". Another suggested monitoring rule may be, "Monitor if content value is greater than building value for my properties in Chicago". A further suggested monitoring rule may be, "Monitor if total value per square foot is greater than $500 and less than $550 for my properties in Alaska". In this collection of examples, the properties selected for analysis may be based on user selections or current content 502A-C in the webpage 500 from which the monitoring system plugin 504 was invoked. A "More" selection 605 may be clicked by the user, and in response thereto, the chatbot output 602 can be expanded to display additional sample queries as monitoring suggestions in the interactive chat session 601. User selections can be made by directly clicking within the interactive chat session 601. Alternatively, users can directly enter text as typed text or audio text through a user input interface 606. For example, the keyboard 250, a virtual keyboard, or audio device 265 of FIG. 2 can be used to enter text in the user input interface 606. Voice input received through a microphone, such as through audio device 265, can be converted into text, for instance, using known voice-to-text conversion tools. Natural language processing can support the entry of free-form text, e.g., as typed or audio input, without requiring users to have detailed knowledge of the underlying data sources or formal query formation rules.

As text is entered or selections are made, the interactive chat session 601 can capture the input or selections and determine a next step. Where users enter text in the user input interface 606, the intent classification service 404 of FIG. 4 can be invoked to interpret user provided input. Where a user directly enters a query request through the user input interface 606, the entity cleanser 412 of FIG. 4 can be invoked to ensure that entities and criteria entered by the user in a natural language format can be mapped to a format useable by the rule execution service 416 of FIG. 4. The intent classification service 404 can also be used to determine a monitoring type to be performed when the user enters a natural language query. Examples of monitoring intents for a query can include, for instance, data-driven monitoring, third-party services-driven monitoring, and model-driven monitoring. The intent classification service 404 can use natural language processing to detect language constructs and perform conversions into a direct machine-interpretable format that complies with underlying data structure formatting conventions.

Data-driven monitoring can allow the user to monitor data products for changes, thresholds, and various business rules. For example, a data-driven monitoring rule could be, "Alert me when growth of restaurant industry in the state of Texas falls below 5%".

Third-party services-driven monitoring can allow the user to monitor impacts based on third-party data services, such as weather services 118, wildfire services 120, flood services 122, and other such services. For example, a third-party services-driven monitoring rule could be, "Alert me when any of my properties in California are within 25 miles radius of an active wildfire". Other types of peril situations can be used in rule construction, such as conditions or events related to thunderstorms, tropical storms, hurricanes, floods, snowstorms, hailstorms, tornados, earthquakes, and the like.

Model-driven monitoring can allow users to monitor data based on artificial intelligence/machine learning model results. For example, a model-driven monitoring rule could be, "Alert me if there are any outliers in my property value data for properties in Alaska".

Each query can include several entities, which are extracted from natural language queries and used to determine which types of filters or rules to apply to the data. The entities can determine a data source to pull from, an API to call, a column or columns to compare, a type of comparison to make (e.g., $<, >, =, \ldots$), a value to compare, a location to limit results to (e.g., ZIP code, city, state, geographic regions supported), an aggregate of a column over a certain location, performance of a mathematic operation on one or more columns, a combination of two or more filters together with Boolean logic, and other such supporting information.

A "Guide Me" selection 608 can be used to initiate a question and answer dialog as a guided mode in the interactive chat session 601 to build the monitoring rule through answers to questions. Further, where a user-submitted query cannot be parsed and built into a valid monitoring rule, the monitoring system 136 can automatically invoke a guided mode to ask the user to explicitly specify any missing entities.

Figure 6B:
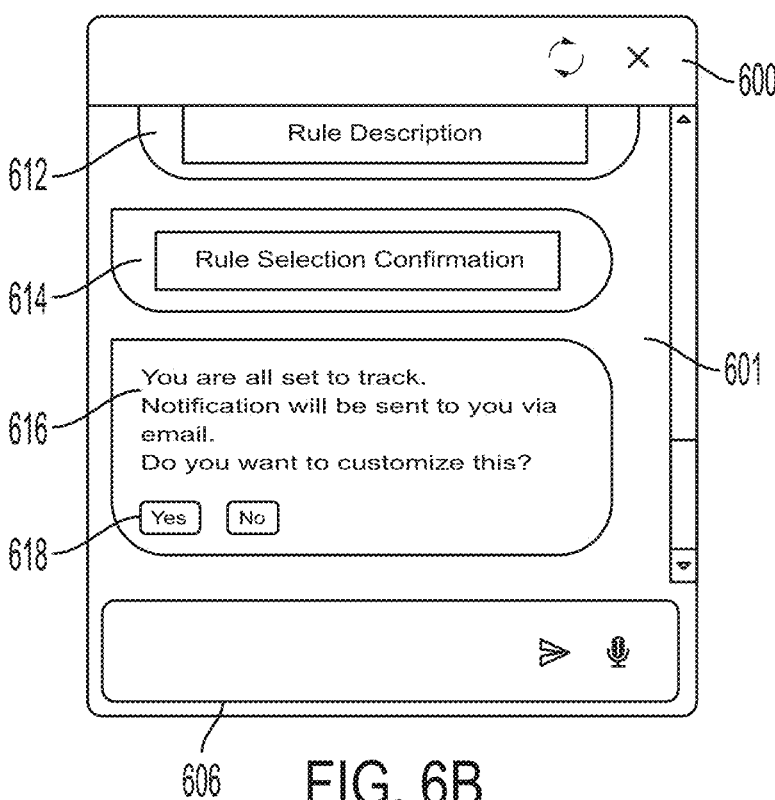
FIG. 6B depicts a customization interface for user customization of monitoring rules according to some embodiments of the present invention.

FIG. 6B depicts a customization interface through the user interface 600 for user customization of monitoring rules according to some embodiments. When the guided mode is invoked by a user selection or an incomplete response, the interactive chat session 601 can continue with a series of questions allowing the user to explicitly specify required entities and/or other missing information. Guided mode can be initiated from the beginning or be used to obtain the missing entities after submitting a request. A sample guided-mode question is: "What would you like to monitor?".

After obtaining all entities in a rule description 612, the monitoring system 136 can confirm the user's choice with a rule selection confirmation 614 and present a notification option 616 for customization. The rule selection confirmation 614 may include an updated version of the user's query from the rule description in a cleansed form, for instance, as modified by the entity cleanser 412 of FIG. 4. The user can submit the resulting query for default execution or customize the query further. Default execution on the query may be implemented as an immediate one-time execution with no visualizations. The user can request further customization by making a customization request 618 through the interactive chat session 601. Further inputs can be entered through the user input interface 606.

Figure 7:
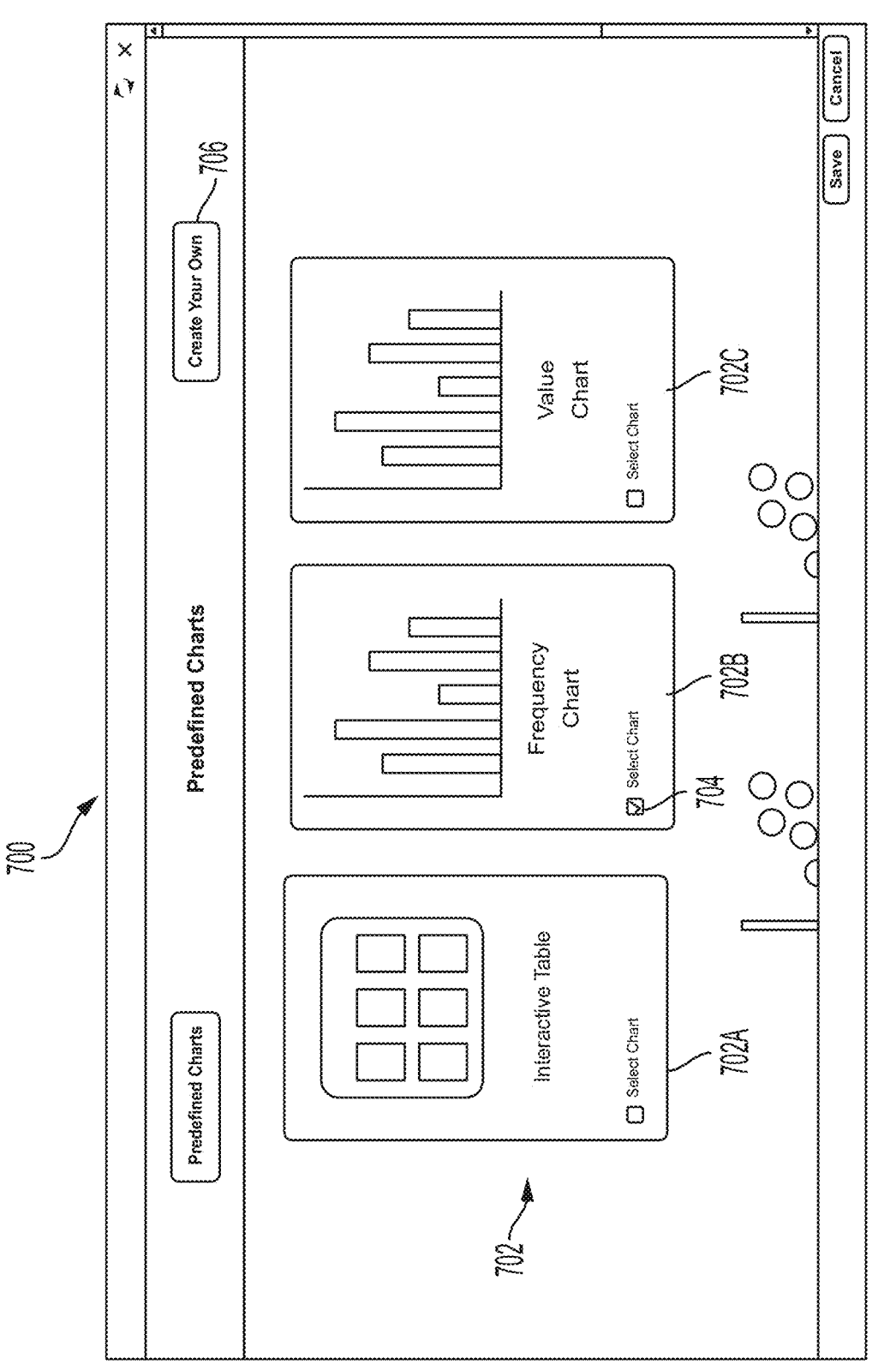
FIG. 7 depicts a chart customization interface for user customization of notification details according to some embodiments of the present invention.

FIG. 7 depicts a chart customization interface 700 for user customization of notification details according to some embodiments. When a user requests customization, for example, through the customization request 618 of FIG. 6B, the chart customization interface 700 can be invoked. The chart customization interface 700 can show suggestions of preconfigured charts 702 based on the type of data being monitored. For example, the preconfigured charts 702 can include an interactive table 702A, a frequency chart 702B, a value chart 702C, and other such charts. The monitoring system 136 can self-learn from users to determine which charts have been selected to monitor similar data elements and optimize the suggestions accordingly. For instance, if the frequency chart 702B is most commonly used for similar or the same monitoring rule configuration, the monitoring system 136 can preselect 704 the frequency chart 702B as a suggestion which the user can change if desired. Further, users can create their own charts by selecting a "Create Your Own" option 706. The flexibility of the chart customization interface 700 can allow the user to get more insights about the data being monitored when the monitoring criteria are met and the notification is presented. The user can also have an option to set the execution frequency of the monitoring rules 156 (e.g., once per week, Monday, 9:00 A.M., for 5 weeks) to configure the scheduler service 418 of FIG. 4.

Once the user confirms a new rule, it is added to the monitoring rules 156, where the submitted rules which are currently active are scheduled for execution. The metadata repository 408 can track information about the monitoring rules 156, data products, rule execution frequency, and the user or users to notify once each rule executes.

The rule execution service 416 of FIG. 4 can monitor the metadata repository 408 for new rules to execute. Once found, the rule execution service 416 can send the rule information to the API service 420 or query service 422 to submit the required API/query calls and return the resulting data. The scheduler service 418 of FIG. 4 can be used if the user has opted for scheduling of the monitoring rules 156.

The query service 422 can take key information described as entities to assemble a properly formed query, depending on the type of data source being used. For example, where a data product exists as a SQL server table, the query service 422 can automatically create a properly formatted SQL query from the entities. The monitoring system 136 does not require that any data sources are loaded into the monitoring system 136 to function; rather, the monitoring system 136 is configured with the ability to connect to data sources and query for the results.

The API service 420 of FIG. 4 can handle API-based rules, where data required for calling the APIs is prepared, and the desired result is returned. The API service 420 and the query service 422 can each check if monitoring criteria are met after querying the data.

If the monitoring criteria are met, an event can be triggered to the notification services 314 to handle the notification of information to users based on user preferences. The push notification service 428 of FIG. 4 can provide users with an instant alert in the form of push notifications to applications, email, and/or text messages. Users can also opt to extract data that meets the monitoring criteria.

Figures 8A, 8B:
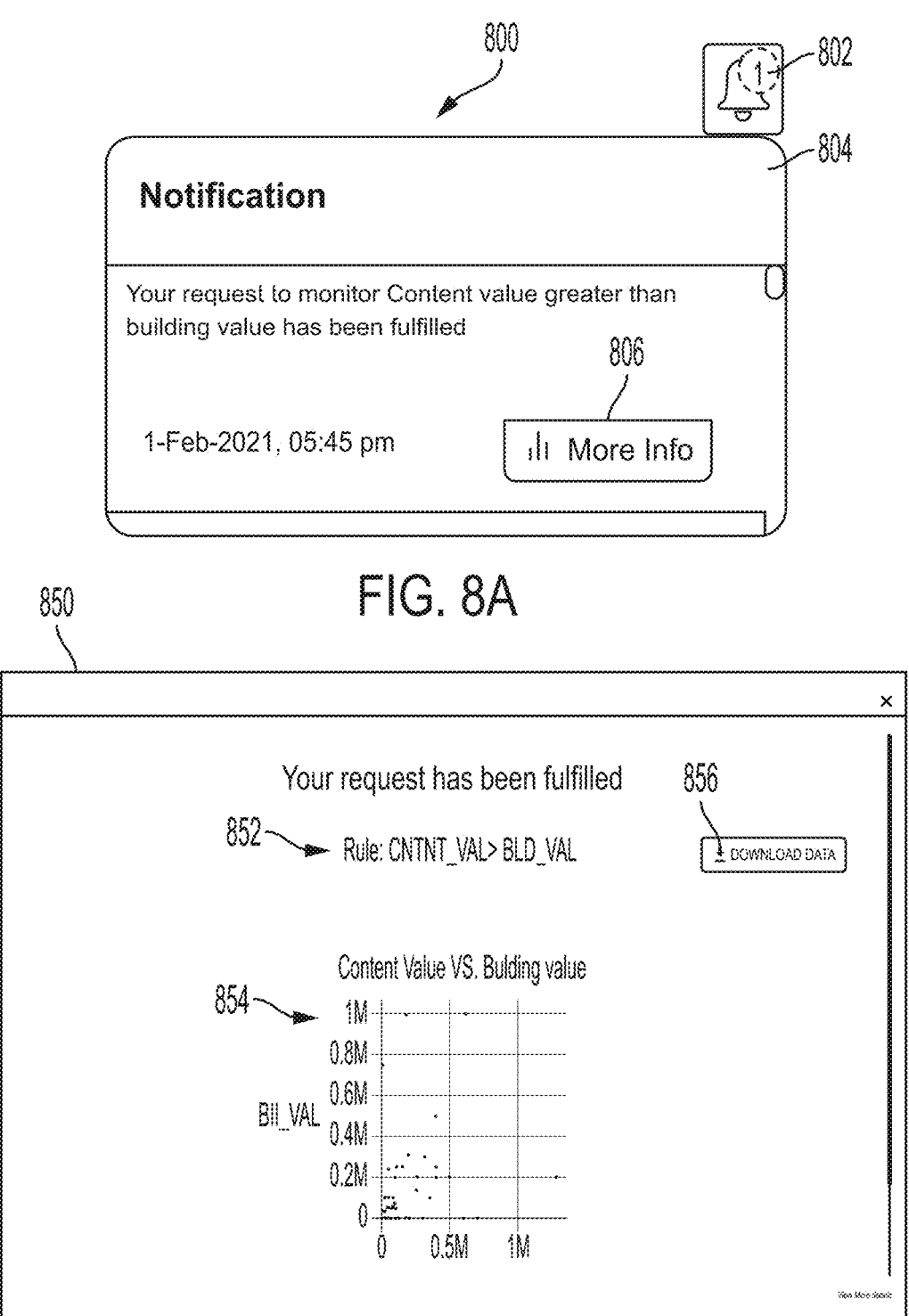
FIG. 8A depicts a notification according to some embodiments of the present invention.
FIG. 8B depicts notification fulfillment details associated with the notification of FIG. 8A according to some embodiments of the present invention.

FIG. 8A depicts a notification 800 according to some embodiments. The results of executed monitoring rules can be stored in the metadata repository 408 of FIG. 4. When a user logs on, the metadata repository 408 can be scanned to determine whether there are any new results for the user since the last logon event. If so, an indicator, such as a notification bell 802 can be output to inform the user that there are query results to view. The user can view a monitoring result message 804 of the notification and click a "More Info" selection 806 to view a subset of the results.

FIG. 8B depicts notification fulfillment details 850 associated with the notification 800 of FIG. 8A according to some embodiments. In the example of FIG. 8B, a summary 852 of the monitoring rule 156 that was met can be displayed along with any selected charts 854. Data products can be displayed with a preconfigured set of columns by default and selected visualizations. For very large datasets, the full results may not appear. In this case, the user can click a "Download Data" button 856 in order to download the full monitoring result, for instance, as a file.

Figure 9:
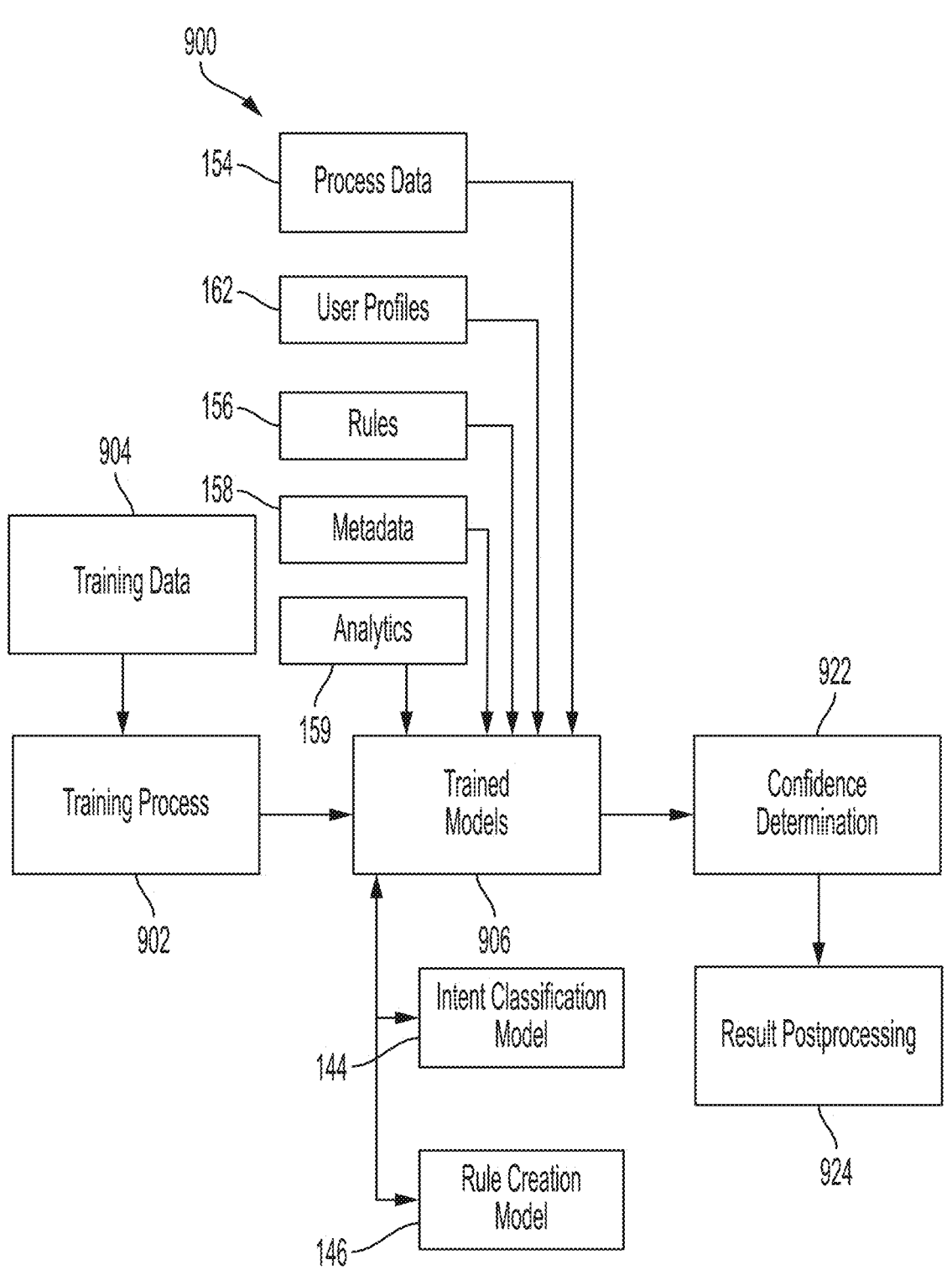
FIG. 9 depicts a model training and usage process according to some embodiments of the present invention.

FIG. 9 depicts a model training and usage process 900 according to some embodiments. The model training and usage process 900 can include a training process 902 that analyzes training data 904 to develop trained models 906, such as the intent classification model 144 and/or rule creation model 146. The training process 902 can use labeled or unlabeled data in the training data 904 to learn features, such as a entities, entity relationships, components for data retrieval, user characteristics, and/or other derived characteristics. The training data 904 can include a set of training data to establish a ground truth for learning coefficients/weights and other such features known in the art of machine learning to develop trained models 906. The trained models 906 can include a family of models to identify specific types of features and make recommendations. Other models and further subdivision of the trained models 906 can be incorporated in various embodiments. The intent classification model 144 can learn how to map natural language statements to entities for query formation. The rule creation model 146 can learn how to construct monitoring rules based on similarities between users, processes, data sources, and results of previous rule execution.

The intent classification model 144 can also be trained to make suggestions, in part, based on previous monitoring rules created for other users by the rule creation model 146. Various inputs to the trained models 906 can include process data 154, user profiles 162, monitoring rules 156, metadata 158, and/or analytics 159. The trained models 906 may also include natural language processing used by other components, such as the artificial intelligence services 308 of FIG. 3.

The trained models 906 can result in a confidence determination 922 associated with intent classification and/or monitoring rule creation. As greater details are refined, the trained models 906 can make more accurate intent classifications and monitoring rule generation, leading to improved chatbot performance, more accurate queries, and reduced network traffic and processing associated with query precision. The results of the confidence determination 922 can be further conditioned by result postprocessing 924. The result postprocessing 924 can cross-compare results of the confidence determination 922 to make a final determination of the intent classification and/or rule creation. The result postprocessing 924 can be tracked to support future machine learning. Although the example of FIG. 9 depicts a particular set of inputs and models, it will be understood that additional inputs and models can be implemented.

Turning now to FIG. 10, a process flow 1000 is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the monitoring server 102 of FIG. 1 in combination with the data processing server 105, the one or more user systems 106, the one or more data storage servers 110, and/or external servers 116. The process flow 1000 is described in reference to FIGS. 1-10. For purposes of explanation, reference is made to the monitoring system 136 as performing the steps herein.

At step 1002, the monitoring system 136 can provide one or more sample queries associated with one or more entities based on a user profile of a user accessing the monitoring system 136. The sample queries can be presented as monitoring suggestions 604. The monitoring suggestions 604 can be determined using the artificial intelligence services 308 to align similar characteristics of users and data sources.

At step 1004, the monitoring system 136 can process a new query request using natural language processing based on detecting a user selection. For example, the user selection can be received through an interactive chat session 601.

At step 1006, the monitoring system 136 can determine a monitoring type for the new query based on one or more interactions between the monitoring system 136 and the user. The monitoring type can include, for instance, data-driven monitoring, third-party services-driven monitoring, and model-driven monitoring.

At step 1008, the monitoring system 136 can present the user with one or more questions to guide query formation of the new query, for instance, through an interactive chat session 601. The questions can be structured to identify entities and monitoring criteria until a fully formed monitoring rule can be constructed that complies with rule execution requirements.

At step 1010, the monitoring system 136 can configure one or more monitoring rules 156 based on one or more user responses to schedule execution of the new query. Query execution can be scheduled, for instance, through the scheduler service 418 of FIG. 4.

Turning now to FIG. 11, a process flow 1100 of a monitoring process is depicted according to an embodiment. The process flow 1100 includes a number of steps that may be performed in the depicted sequence or in an alternate sequence. The process flow 1100 may be performed by the system 100 of FIG. 1. In one embodiment, the process flow 1100 is performed by the monitoring server 102 of FIG. 1 in combination with the data processing server 105, the one or more user systems 106, the one or more data storage servers 110, and/or external servers 116. The process flow 1100 is described in reference to FIGS. 1-11.

At step 1102, the monitoring system 136 can access one or more monitoring rules 156 that define monitoring criteria associated with a plurality of components. The components can include one or more third-party data services. The one or more third-party data services can include one or more of a weather service 118, a wildfire service 120, and a flood service 122.

At step 1104, the monitoring system 136 can monitor the components to determine whether the monitoring criteria are met. The monitoring can include data-driven monitoring configured to monitor for data changes through the components. The monitoring can include third-party service-driven monitoring configured to monitor for condition changes associated with a targeted geographic area. The monitoring can include model-driven monitoring configured to detect one or more derived values or derived conditions. The monitoring system 136 can include a scheduler service 418 configured to schedule the monitoring of the components with respect to the one or more monitoring rules 156. The monitoring system 136 can include a query service 422 configured to access one or more databases as part of the monitoring to determine whether the monitoring criteria are met.

At step 1106, the monitoring system 136 can trigger a notification to one or more user systems 106 based on determining that at least one of the monitoring criteria has been met. The monitoring system 136 can also include a notification service 314 configured to output the notification to the one or more user systems 106 and allow viewing of data associated with the one or more results through a user interface.

At step 1108, the monitoring system 136 can provide a customization interface to allow user customization of the one or more monitoring rules 156. The customization interface can provide editing of the monitoring criteria and one or more aspects of the notification. In some embodiments, the customization interface can include a chatbot interface configured to suggest setting the monitoring criteria based on one or more usage patterns of one or more users identified as having at least one shared characteristic with a user of the customization interface.

At step 1110, the monitoring system 136 can update scheduling and/or notification based on detecting a change to the one or more monitoring rules 156.

In embodiments, the monitoring system 136 can include a plugin, such as plugin 320, configured to be embedded within a host webpage or application 316. In some embodiments, the monitoring system 136 can be an application with a standalone front-end interface. Further, the monitoring system 136 can include an intent classification service 404 configured to apply natural language processing to extract an intent and one or more entities from a user input. The monitoring system 136 can include a rule creation service 406 configured to create or modify the one or more monitoring rules 156 based on the intent and the one or more entities. The monitoring system 136 can include a registry, such as the metadata repository 408, configured to store metadata 158 to access the components, the one or more monitoring rules 156, and one or more results of executing the one or more monitoring rules 156. The results of executing the one or more monitoring rules 156 can be reflected in the analytics 159. The monitoring system 136 can include a rule execution service 416 configured to execute the one or more monitoring rules 156 and filter one or more results based on one or more categories.

The monitoring system 136 can include an input cleanser, such as entity cleanser 412, configured to translate user input into a format that complies with one or more formatting rules. Further, the monitoring system 136 can include a chart builder configured to generate one or more charts associated with monitored data from the components.

Technical effects include scheduling background monitoring of targeted data sources to align with a targeted scheduling interval. Notifications can be generated when one or more monitoring criteria are met. Providing a shared monitoring system can allow for efficient monitoring rule suggestions for consistency and a reduced number of separate queries. For example, where the same monitoring rule is shared by multiple users, network traffic can be reduced, and results of a single scheduled query can be shared by multiple users who select the same suggested monitoring rules.

It will be appreciated that aspects of the present invention may be embodied as a system, method, or computer program product and may take the form of a hardware embodiment, a software embodiment (including firmware, resident software, micro-code, etc.), or a combination thereof. Further-more, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a network interface configured to communicate with a plurality of components across a network;
   a memory system configured to store a plurality of instructions to implement a monitoring system; and
   a processing system configured to communicate with the network interface and execute the instructions to result in:
      accessing one or more monitoring rules that define monitoring criteria associated with the components;
      monitoring the components to determine whether the monitoring criteria are met, wherein the monitoring comprises data-driven monitoring configured to monitor for data changes through the components, third-party service driven monitoring configured to monitor for condition changes associated with a targeted geographic area, and model-driven monitoring configured to detect one or more derived values or derived conditions;

triggering a notification to one or more user systems based on determining that at least one of the monitoring criteria has been met;

providing a customization interface through a graphical user interface to allow user customization of the one or more monitoring rules, wherein the customization interface provides editing of the monitoring criteria and a chatbot interface configured to suggest setting the monitoring criteria in a guided mode through the graphical user interface, and wherein the guided mode is invoked based on determining that a user-submitted query cannot be parsed and built into a valid monitoring rule, the guided mode is user-invocable based on a user selection through the graphical user interface, and invoking the guided mode initiates a question and answer dialog in an interactive chat session to build the valid monitoring rule through answers to questions through the graphical user interface and select between the data-driven monitoring, the third-party service driven monitoring, and the model-driven monitoring; and suggesting, through the chatbot interface, setting the monitoring criteria based on one or more usage patterns of one or more users identified as having at least one shared characteristic with a user of the customization interface.

2. The system of claim 1, wherein the monitoring system comprises a plugin configured to be embedded within a host webpage or application.

3. The system of claim 1, wherein the monitoring system comprises an application comprising a standalone front-end interface.

4. The system of claim 1, wherein the components comprise one or more third-party data services.

5. The system of claim 4, wherein the one or more third-party data services comprise one or more of a weather service, a wildfire service, and a flood service.

6. The system of claim 1, wherein the monitoring system comprises an intent classification service configured to apply natural language processing to extract an intent and one or more entities from a user input.

7. The system of claim 6, wherein the monitoring system comprises a rule creation service configured to create or modify the one or more monitoring rules based on the intent and the one or more entities.

8. The system of claim 1, wherein the monitoring system comprises a registry configured to store metadata to access the components, the one or more monitoring rules, and one or more results of executing the one or more monitoring rules.

9. The system of claim 8, wherein the monitoring system comprises a rule execution service configured to execute the one or more monitoring rules and filter the one or more results based on one or more categories.

10. The system of claim 8, wherein the monitoring system comprises a notification service configured to output the notification to the one or more user systems and allow viewing of data associated with the one or more results through a user interface.

11. The system of claim 1, wherein the customization interface provides editing of one or more aspects of the notification.

12. The system of claim 1, wherein the monitoring system comprises an input cleanser configured to translate user input into a format that complies with one or more formatting rules.

13. The system of claim 1, wherein the monitoring system comprises a chart builder configured to generate one or more charts associated with monitored data from the components.

14. The system of claim 1, wherein the monitoring system comprises a scheduler service configured to schedule the monitoring of the components with respect to the one or more monitoring rules.

15. The system of claim 1, wherein the monitoring system comprises a query service configured to access one or more databases as part of the monitoring to determine whether the monitoring criteria are met.

16. The system of claim 1, wherein the components comprise services accessed through one or more application programming interfaces through the network interface, and the notifications are passed through a visualization application programming interface that interfaces with one or more applications and/or webpages.

17. The system of claim 16, wherein the monitoring system comprises a plugin configured to be embedded within the one or more applications and/or webpages, and the plugin is configured to trigger an action through the visualization application programming interface to request performance of the action by the monitoring system based on detecting a selection of the plugin.

18. A computer program product comprising a non-transitory computer-readable storage medium embodied with computer program instructions that when executed by a computer cause the computer to implement:

accessing one or more monitoring rules that define monitoring criteria associated with a plurality of components;

monitoring the components to determine whether the monitoring criteria are met, wherein the monitoring comprises data-driven monitoring configured to monitor for data changes through the components, third-party service driven monitoring configured to monitor for condition changes associated with a targeted geographic area, and model-driven monitoring configured to detect one or more derived values or derived conditions;

triggering a notification to one or more user systems based on determining that at least one of the monitoring criteria has been met;

providing a customization interface through a graphical user interface to allow user customization of the one or more monitoring rules, wherein the customization interface provides editing of the monitoring criteria and a chatbot interface configured to suggest setting the monitoring criteria in a guided mode through the graphical user interface, and wherein the guided mode is invoked based on determining that a user-submitted query cannot be parsed and built into a valid monitoring rule, the guided mode is user-invocable based on a user selection through the graphical user interface, and invoking the guided mode initiates a question and answer dialog in an interactive chat session to build the valid monitoring rule through answers to questions through the graphical user interface and select between the data-driven monitoring, the third-party service driven monitoring, and the model-driven monitoring; and suggesting, through the chatbot interface, setting the monitoring criteria based on one or more usage patterns of one or more users identified as having at least one shared characteristic with a user of the customization interface.

19. The computer program product of claim 18, further comprising computer program instructions that when executed by the computer cause the computer to implement:

applying natural language processing to extract an intent and one or more entities from a user input; and creating the one or more monitoring rules based on the intent and the one or more entities.

20. The computer program product of claim 18, further comprising computer program instructions that when executed by the computer cause the computer to implement:

executing the one or more monitoring rules;

filtering one or more results of executing the one or more monitoring rules based on one or more categories; and storing the one or more results in a registry.

21. The computer program product of claim 18, further comprising computer program instructions that when executed by the computer cause the computer to implement:

scheduling the monitoring of the components with respect to the one or more monitoring rules; and accessing one or more databases as part of the monitoring to determine whether the monitoring criteria are met.

22. The computer program product of claim 18, further comprising computer program instructions that when executed by the computer cause the computer to implement:

providing one or more sample queries associated with one or more entities based on a user profile of a user accessing a monitoring system;

processing a new query request using natural language processing based on detecting a user selection;

determining a monitoring type for the new query based on one or more interactions between the monitoring system and the user;

presenting the user with one or more questions to guide query formation of the new query; and configuring one or more monitoring rules based on one or more user responses to schedule execution of the new query.

23. The computer program product of claim 18, wherein the components comprise services accessed through one or more application programming interfaces through a network interface, and the notifications are passed through a visualization application programming interface that interfaces with one or more applications and/or webpages.

24. The computer program product of claim 23, wherein the computer program instructions implement a monitoring system, and the monitoring system comprises a plugin configured to be embedded within the one or more applications and/or webpages, and the plugin is configured to trigger an action through the visualization application programming interface to request performance of the action by the monitoring system based on detecting a selection of the plugin.

* * * * *